H. J. BAUR.
PLATFORM FARE BOX.
APPLICATION FILED JULY 26, 1919.

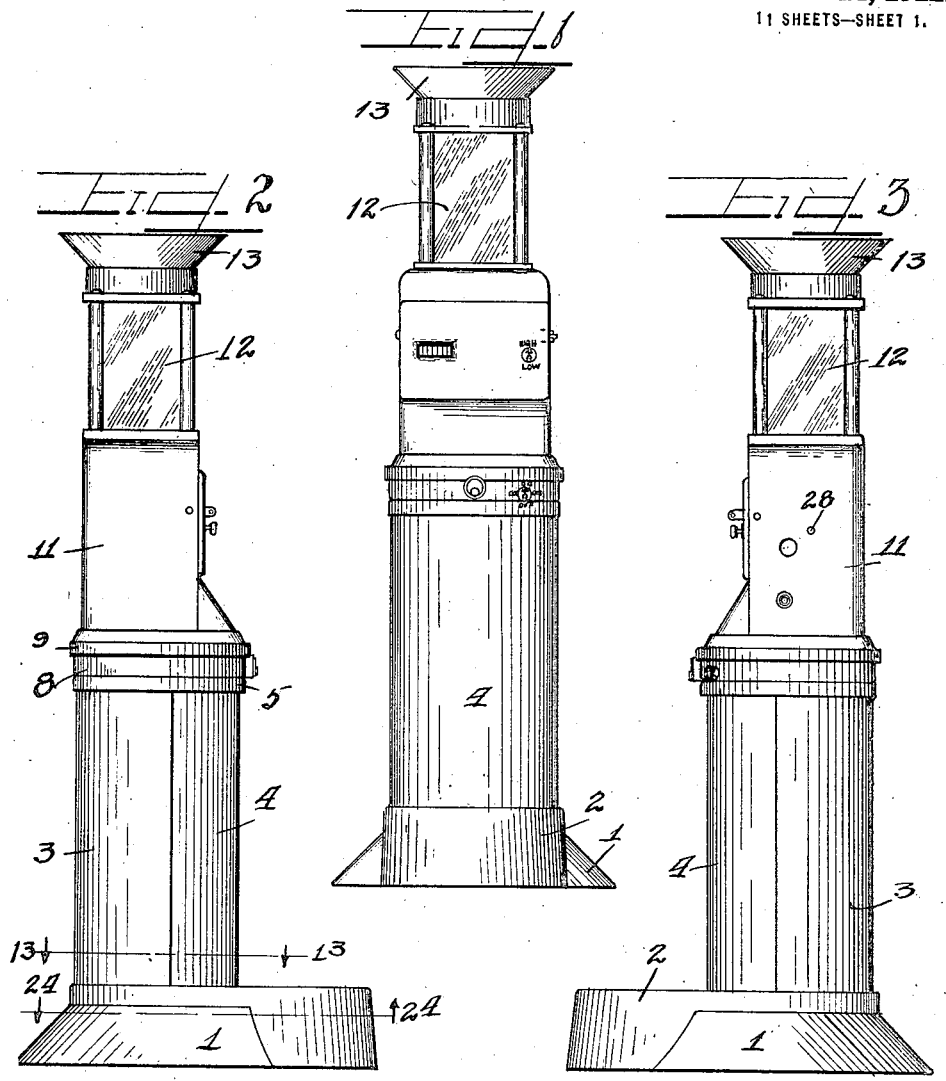

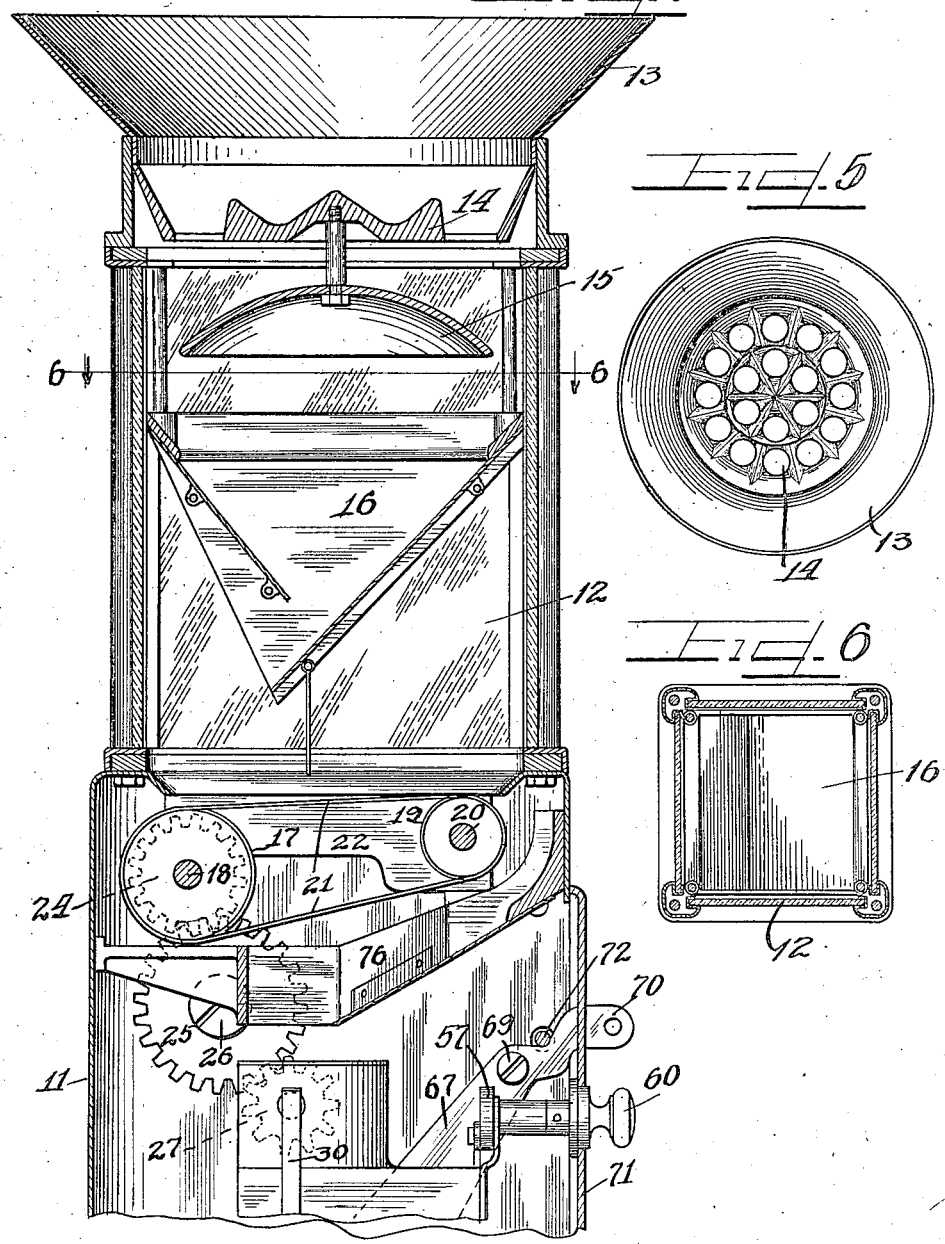

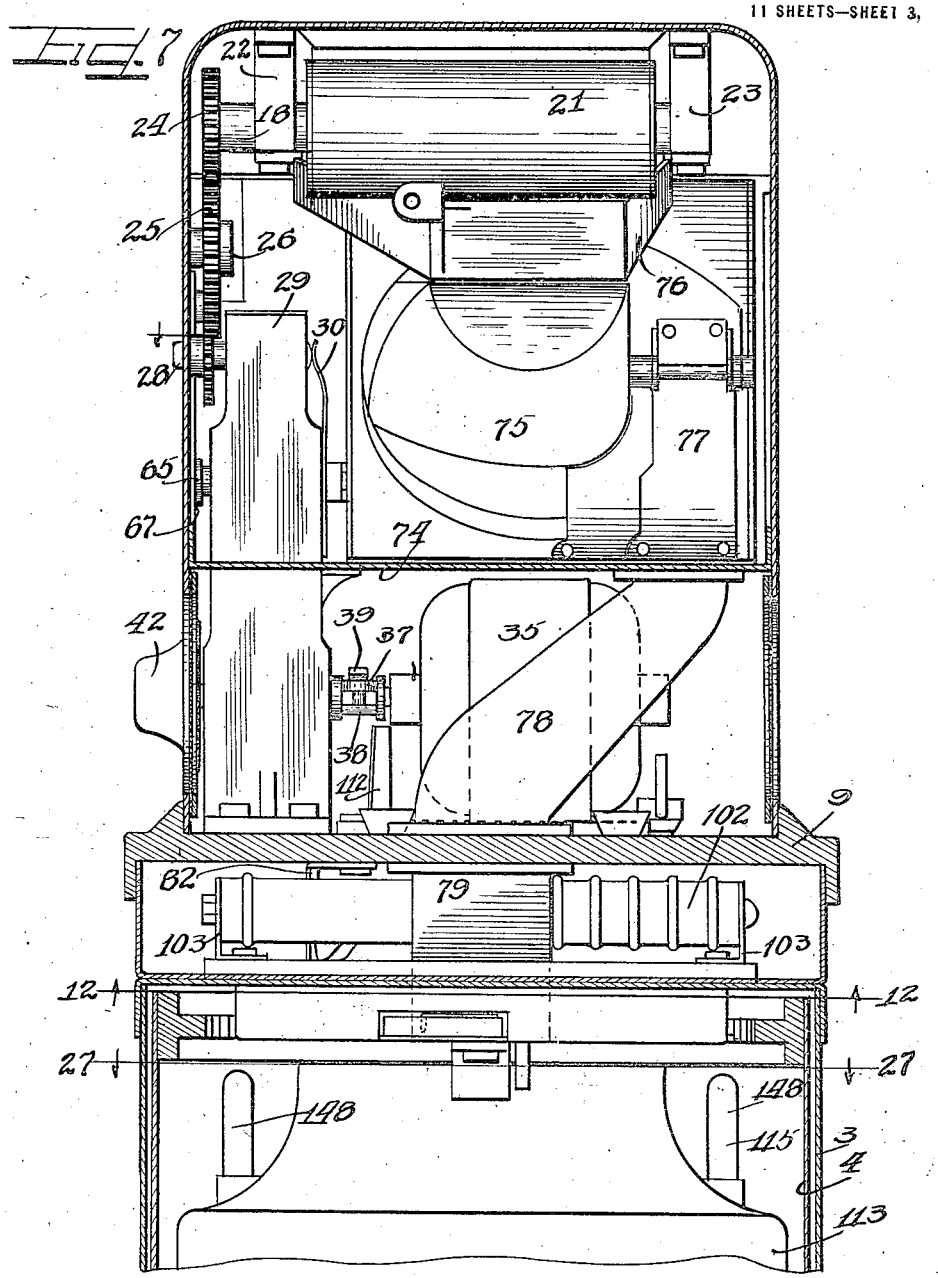

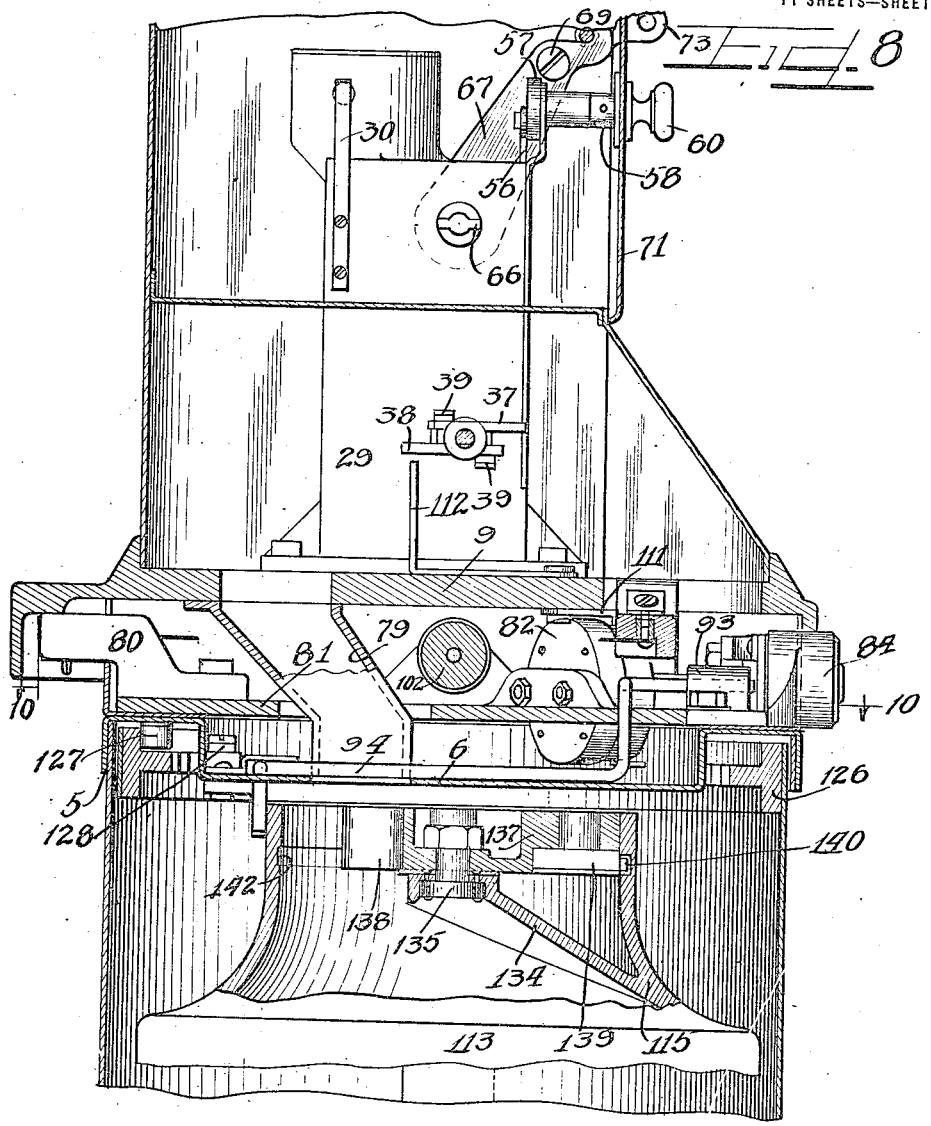

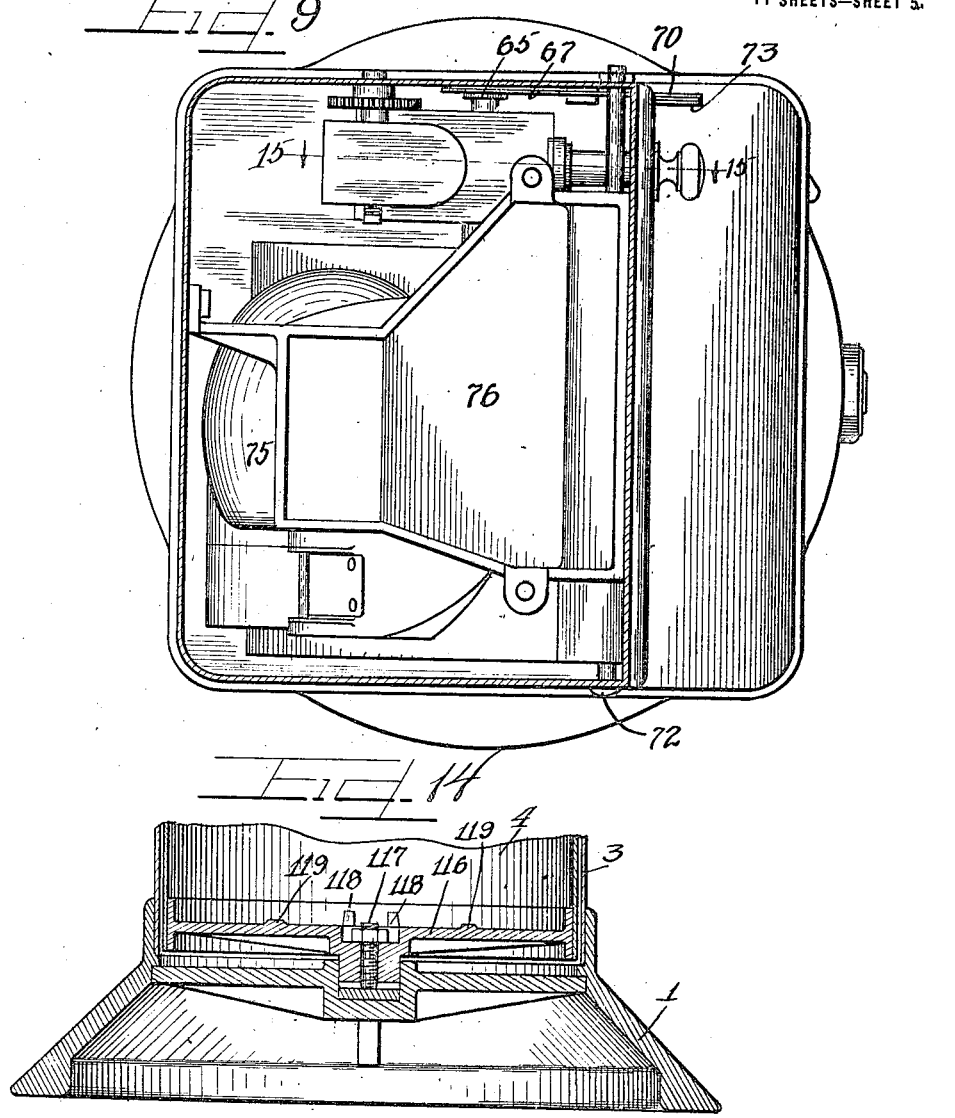

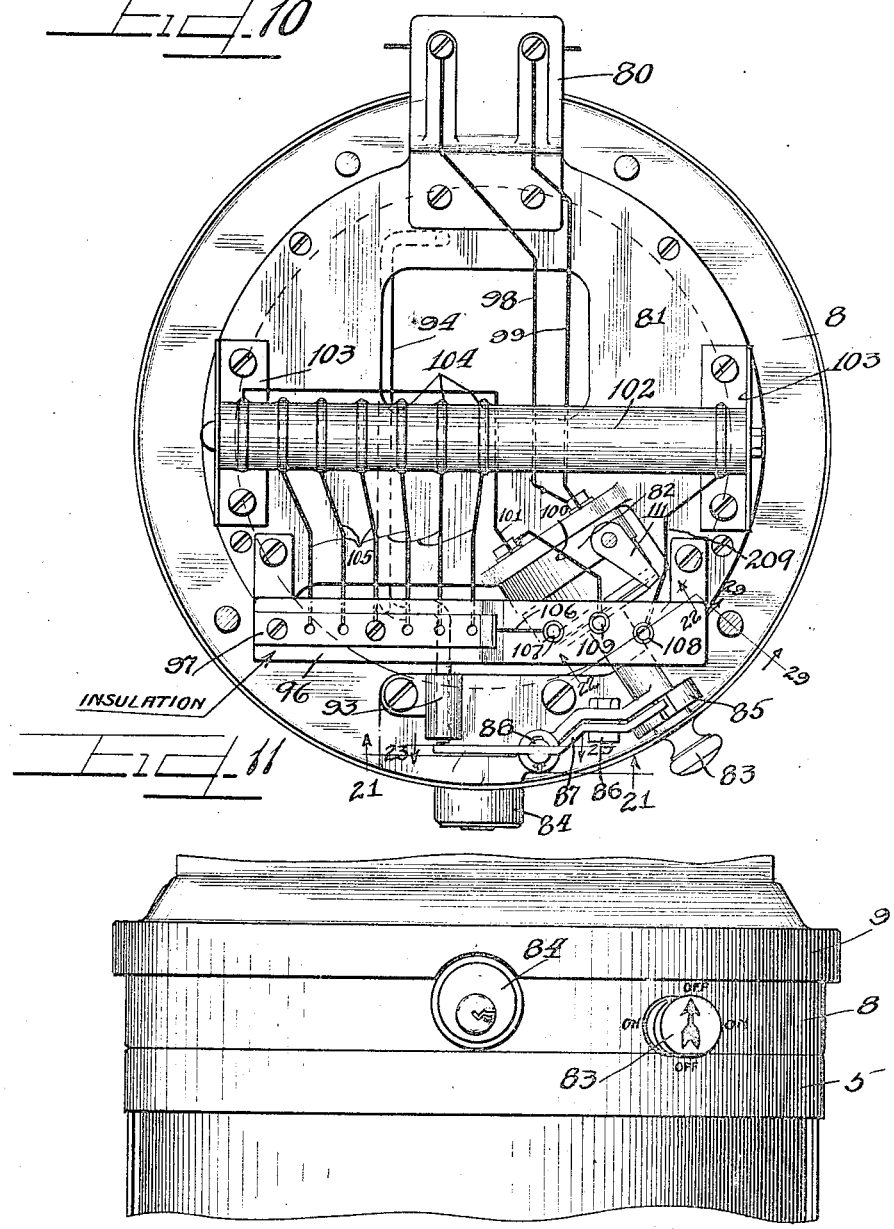

1,435,687.

Patented Nov. 14, 1922.
11 SHEETS—SHEET 7.

Witnesses
J. W. Angell
Charles W. Hill Jr.

Inventor
Hugo J. Baur
by Charles W. Hill Atty

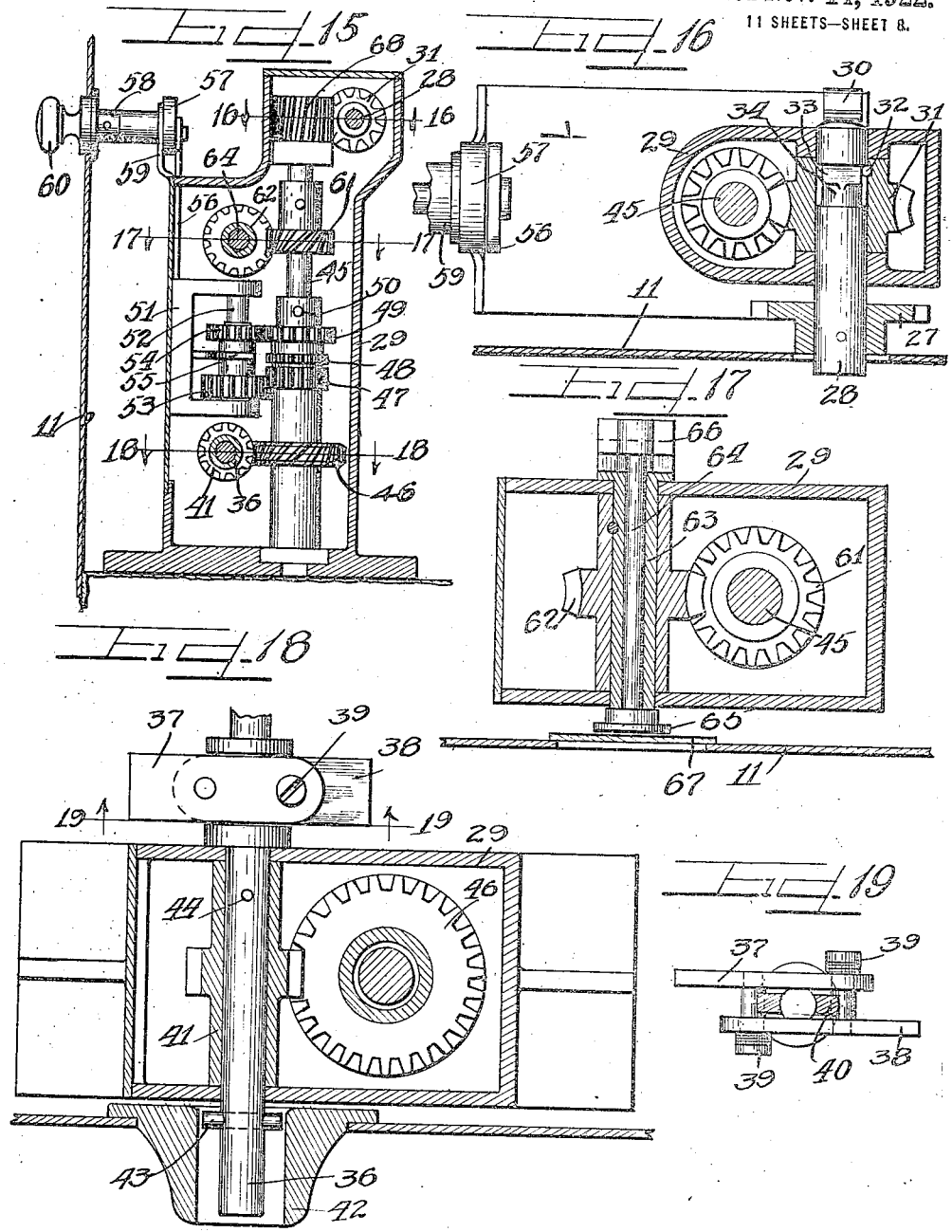

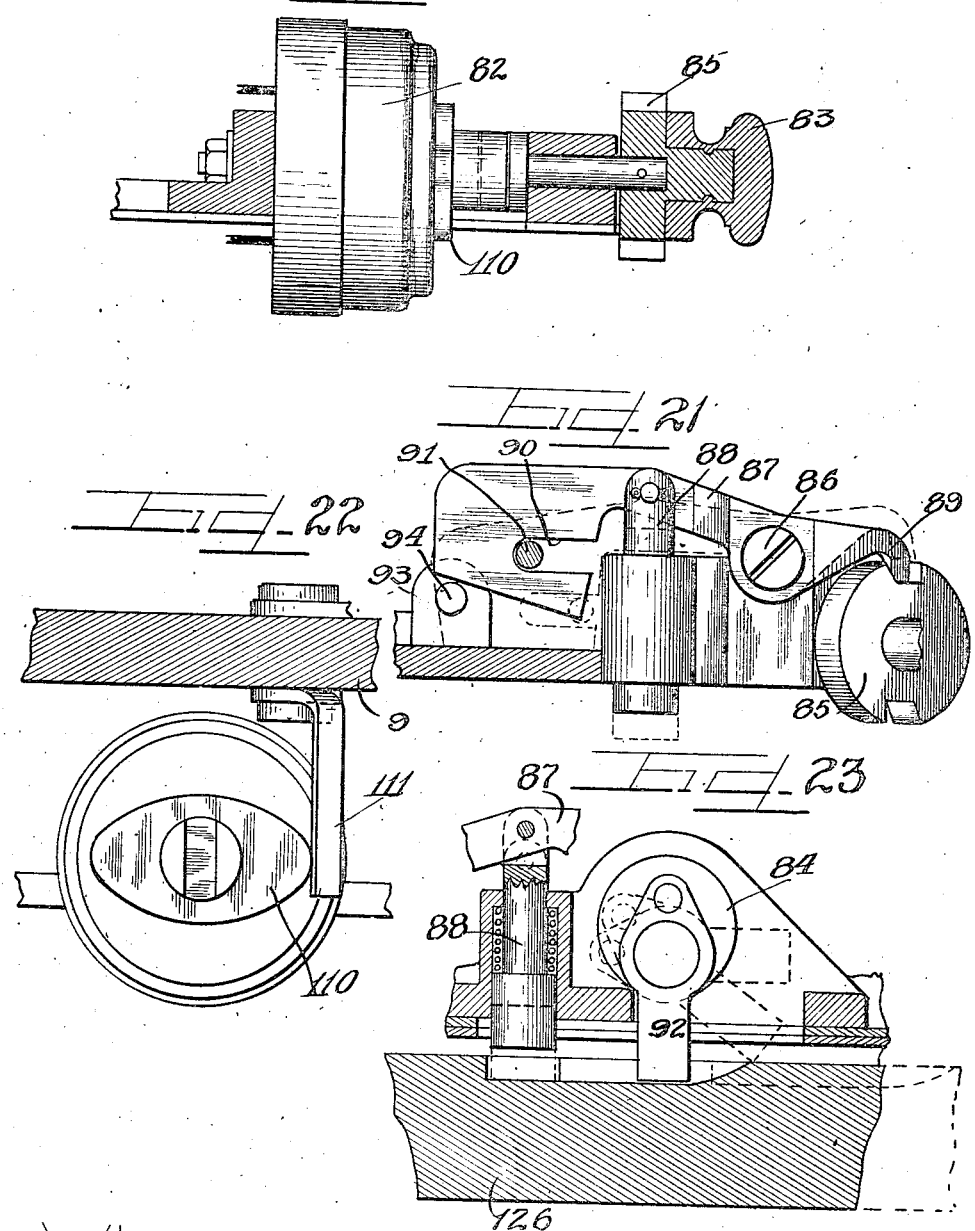

H. J. BAUR.
PLATFORM FARE BOX.
APPLICATION FILED JULY 26, 1919.
1,435,687.
Patented Nov. 14, 1922.
11 SHEETS—SHEET 10.
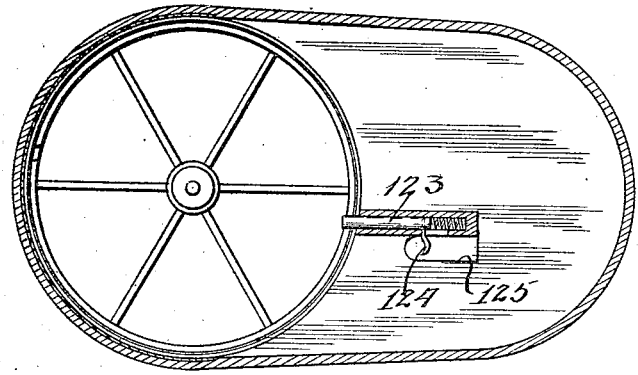
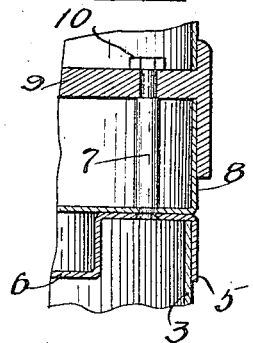
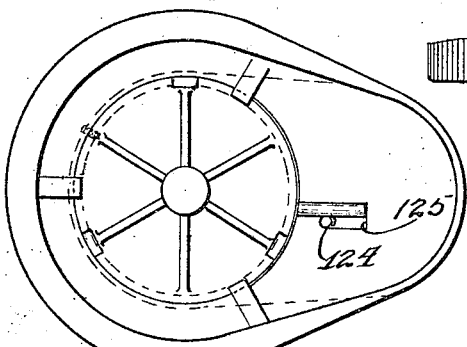
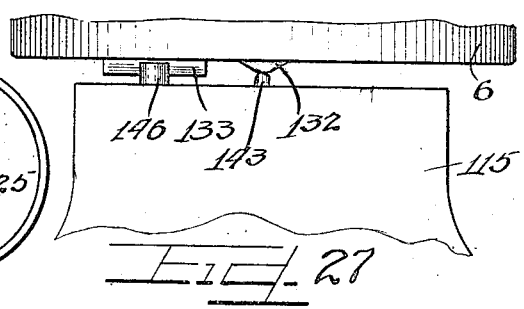
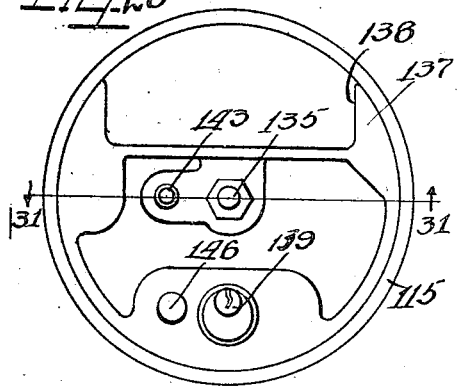
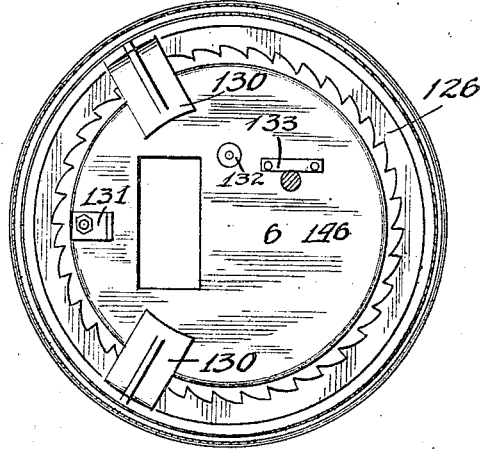
Inventor
Hugo J. Baur

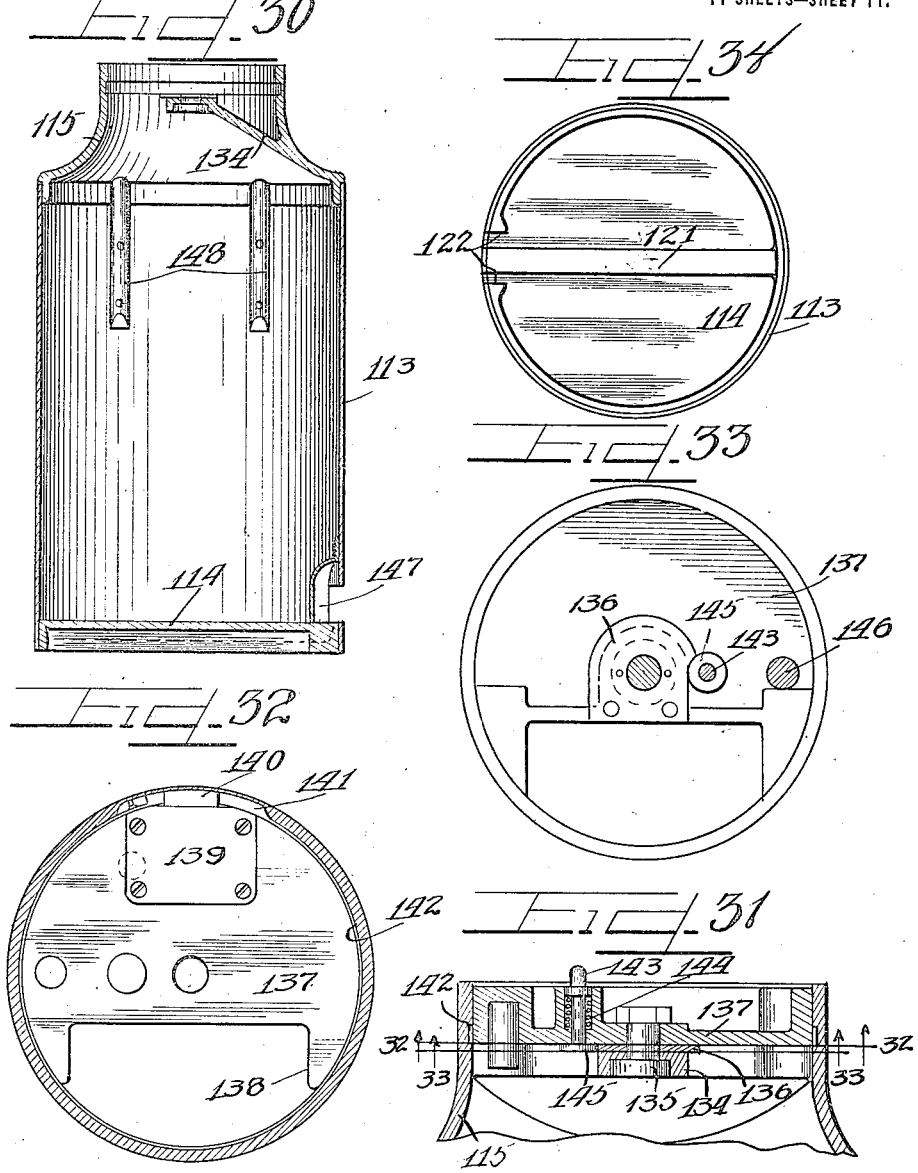

Patented Nov. 14, 1922.

1,435,687

UNITED STATES PATENT OFFICE.

HUGO J. BAUR, OF CHICAGO, ILLINOIS, ASSIGNOR TO JOHNSON FARE BOX COMPANY, A CORPORATION OF NEW YORK.

PLATFORM FARE BOX.

Application filed July 26, 1919. Serial No. 313,492.

*To all whom it may concern:*

Be it known that I, HUGO J. BAUR, a citizen of the United States, and a resident of the city of Chicago, in the county of Cook and State of Illinois, have invented certain new and useful Improvements in a Platform Fare Box; and I do hereby declare that the following is a full, clear, and exact description of the same, reference being had to the accompanying drawings, and to the numerals of reference marked thereon, which form a part of this specification.

This invention relates to an improved type of fare box or fare register for use in connection with transportation lines or in any other connection wherein a receiving mechanism is desirable for the persons paying an entrance fee for deposit of the fee or fare therein whereby the same is automatically registered and discharged to a point of deposit.

The invention further comprehends the use of a receiving receptacle which is removable from the fare box, and which, when placed into the fare box in open condition, is rotated with the closure door of the fare box and locked therein, and prior to withdrawal from the fare box, is automatically locked before transportation to a point of examination and can only be opened by one possessed of a proper key for the purpose. The counting or registering mechanisms of the fare box are power driven so that the coins deposited therein are quickly passed through the counting mechanism and into the receiving receptacle, and the device is so constructed that it is necessary to stop the power mechanism before attempting to open the fare-box for removing the receiving receptacle, thus obviating any possibility of coins being passed through the machine when the receptacle is not in place. Not only is it necessary to stop the power drive to the fare box before attempting to remove the coin receiving receptacle, but means are also provided to prevent restarting the power drive until the same or another receptacle has been properly placed into the fare box and locked therein to receive the coins passed through the machine.

It is an object, therefore, of this invention to provide a power driven fare box having mechanism adapted to receive coins deposited into the fare box to register the same and thereafter pass the same to a receptacle, which, prior to removal from the fare box, is automatically locked and can only be opened by one possessed of a proper key for the purpose.

It is also an object of this invention to construct a fare box having a power driven coin counting or registering mechanism and power driven inspection means upon which the coins are carried for a period of time necessary for inspection and then delivered to the registering mechanism and after discharge therefrom pass to a receiving receptacle locked within the fare box in open condition and upon removal from the fare box necessitating stopping of the power drive, automatically locked, and unopenable except by one with a proper key for the purpose.

It is a further object of this invention to provide a power driven fare receiving apparatus provided with continually moving inspection means upon which the coins are carried for inspection and thence discharged to the counting mechanism and after passage therethrough discharged to an open receiving receptacle which is locked within the fare box and is only removable therefrom after stopping of the power drive for the fare box and an adjustment of said receptacle coincident with opening of the fare box for access thereto, the adjustment serving to lock said receptacle in closed condition whereby the same can only be opened by a key for the purpose and after the receptacle is removed from the fare box.

It is furthermore an object of this invention to provide a power driven fare box having a coin counting mechanism and a receiver which is removable from the fare box, into which the coins are finally discharged from the counting mechanism, with said receiver in open communication with the counting mechanism to receive the coins therefrom but upon intended removal therefrom making it necessary to shut off the power drive and apply a brake to the mechanism driven thereby and further, by an opening movement of the parts of the fare box, serving to lock said receptacle in closed condition preliminary to removal thereof from the fare box.

It is a further object of this invention to construct a fare box having a power driven mechanism to handle the coins deposited therein and cause passage of the same into a receptacle which is removable from the fare box, and with said receptacle insertable into the fare box in open condition and then by closure of the fare box rotated into co-active relation with the fare box, and by opening of the fare box again rotated into a locked condition preliminary to removal from the fare box.

It is finally an object of this invention to provide a fare box equipped with power driven coin inspection transferring means discharging the coins after inspection to a registering mechanism, which in turn discharges the coins to a removable receptacle within the fare box, and preliminary to removal thereof from the fare box necessitating stopping of the power drive and complete locking of the receptacle itself so that the same is removed in locked closed condition.

Other and further important objects of the invention will be apparent from the disclosures in the specification and drawings.

The invention (in a preferred form) is illustrated in the drawings and hereinafter more fully described.

On the drawings:

Figure 1 is a front elevation of a fare box embodying the principles of my invention.

Figure 2 is one side elevation thereof.

Figure 3 is the opposite side elevation.

Figure 4 is an enlarged fragmentary central vertical section taken through the upper portion of the fare box.

Figure 5 is a reduced top view of the coin receiving hopper.

Figure 6 is a reduced detail section on line 6—6 of Figure 4.

Figure 7 is an enlarged fragmentary vertical section taken through the fare box below the coin receiving and inspection compartments, showing the assembly of the registering mechanism and power drive therefor.

Figure 8 is a fragmentary enlarged sectional view, showing the interior mechanism partly in section and partly in elevation of the fare box particularly at the point of transfer of the coins from the registering mechanism to the receiving receptacle.

Figure 9 is a section showing the bottom plan view of the coin registering mechanism, with parts omitted and parts in elevation.

Figure 10 is a sectional view taken on line 10—10 of Figure 8.

Figure 11 is a fragmentary enlarged exterior view of the fare box casing showing the lock and motor switch.

Figure 14 is a section taken on line 14—14 of Figure 13.

Figure 15 is a detail section taken on line 15—15 of Figure 9.

Figure 16 is a sectional detail on line 16—16 of Figure 15.

Figure 17 is a sectional detail on line 17—17 of Figure 15.

Figure 18 is a sectional detail on line 18—18 of Figure 15.

Figure 19 is a sectional detail on line 19—19 of Figure 18.

Figure 20 is a fragmentary detail partly in section showing the switch mounted in the fare box casing and illustrated in plan view of Figure 10.

Figure 21 is a sectional detail on line 21—21 of Figure 10.

Figure 22 is a sectional detail on line 22—22 of Figure 10.

Figure 23 is a sectional detail on line 23—23 of Figure 10.

Figure 24 is a. sectional detail on line 24—24 of Figure 2.

Figure 25 is a bottom plan view of the mechanism shown in Figure 24.

Figure 26 is a fragmentary view illustrating the upper end of the receiving receptacle co-acting with certain elements upon the stationary plate of the fare box.

Figure 27 is a sectional detail on line 27—27 of Figure 7.

Figure 28 is a top plan view of the upper end of the receiving receptacle showing the rotatable closure therein.

Figure 29 is a fragmentary detail section through the fare box casing showing the connection of the upper and lower portions at the junction between the registering mechanism and base in which the receiving receptacle is mounted.

Figure 30 is a central vertical section through a rceiving receptacle insertable into the fare box.

Figure 31 is a sectional detail on the line 31—31 of Figure 28.

Figure 32 is a detail section on line 32—32 of Figure 31.

Figure 33 is a detail section on line 33—33 of Figure 31.

Figure 34 is a bottom plan view of the receiving receptacle.

As shown on the drawings:

*General structure.*

Figure 12:
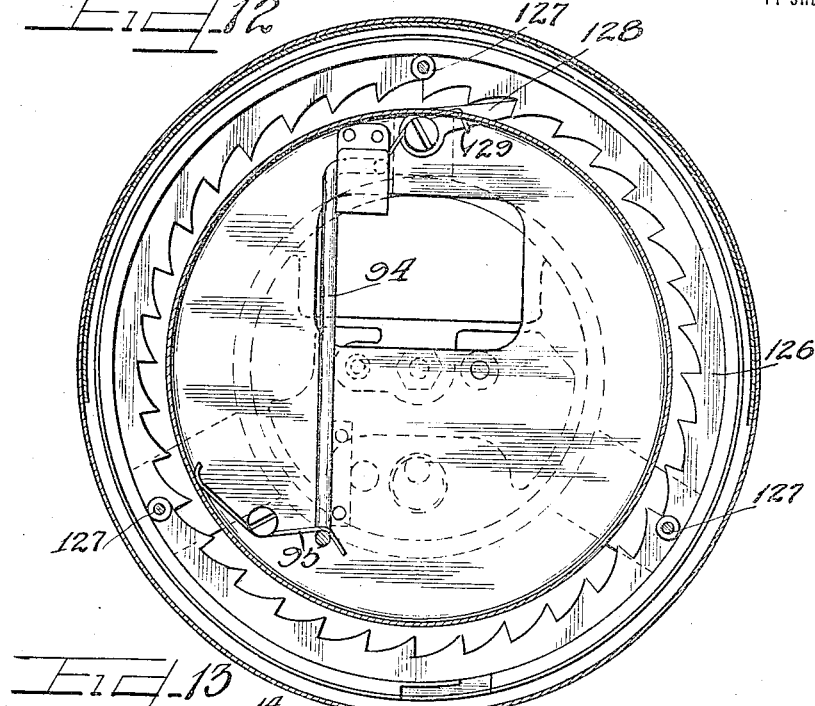
Figure 12 is a sectional view taken on line 12—12 of Figure 7.
Figure 13:
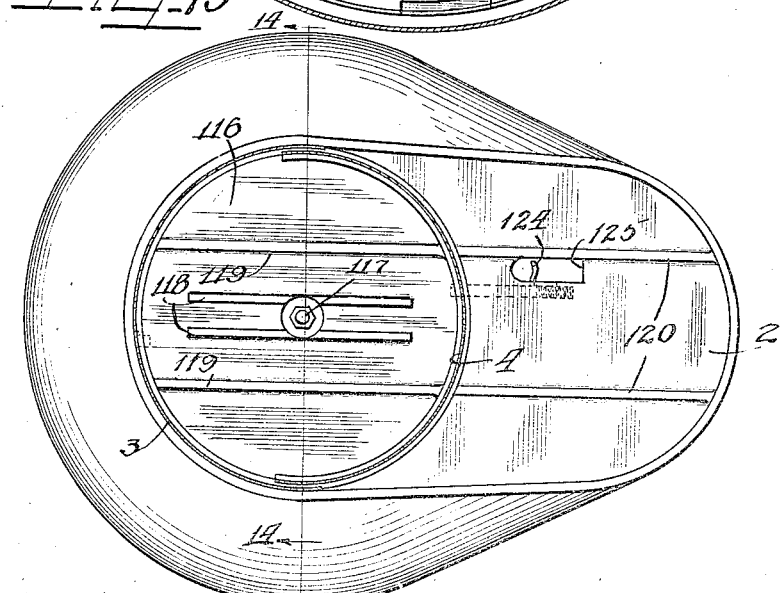
Figure 13 is a section taken on line 13—13 of Figure 2.

Referring first to Figures 1, 2 and 3. the fare box embodying the principles of my invention consists of a base 1, a platform extension 2, and an upright semi-cylindrical portion 3, having a revolvable semi-cylindrical door 4, together forming a compartment for a removable coin receptacle. Secured across the upper end of the semi-cylindrical portion 3, is a circular plate 5, formed downwardly at its central portion as indicated by the reference numeral 6, and shown clearly in Figures 8 and 29. Secured to the top surface of said plate 5, by extended bolts or rivets 7, as shown in Figure 29, is another circular plate 8, which is flanged upwardly oppositely to the downwardly turned flanges of the plate 5, and is secured to a circular flanged frame plate 9, one of the flanges of which overlaps the flange of said plate 8, and said attaching bolts or rivets 7, extend through apertures in said frame plate 9, and are secured tightly thereto by nuts 10. Seated in and rigidly secured to the flanged frame plate 9, is the casing 11, for the coin registering or counting mechanism, and attached on and above the same is a coin inspection compartment 12, provided with a coin receiving hopper 13.

Disposed within the hopper opening 13, as shown in Figures 4 and 5, is an apertured plate 14, the configuration of which is such that a coin must necessarily fall through one of the apertures when deposited into the hopper. Suspended by and beneath said apertured plate 14, is a coin deflecting shield 15, and mounted within the glass enclosure 12, is a coin chute 16, into and through which the coins fall as they glance from said deflecting shield.

Coin inspection and counting mechanisms.

The upper end of the casing 11, on which the coin inspection compartment 12 is supported, is open into said compartment 12, as clearly shown in Figure 4, and mounted directly beneath the opening in the upper end of the casing 11, is a traveling coin receiving and inspection means on which the coins fall from the chute 16. This inspection means consists of one roller 17, on a shaft 18, and another roller 19, on a shaft 20, with a coin carrying belt 21, trained around said respective rollers. As shown clearly in Figure 7, the respective shafts for said rollers are journalled in end bearing plates 22 and 23 respectively, and the shaft 18 has a driving pinion 24 secured on one end thereof forming a part of a gear train consisting of another gear 25, meshing therewith and mounted on a stud shaft 26, on the side wall of the casing, which in turn meshes with and is driven by a pinion 27. Said pinion 27 is secured upon a slidable shaft 28, as shown in detail in Figure 16, the end of said shaft protruding through an aperture in the casing wall 11, and adapted to be pressed inwardly by the finger of an operator controlling the operation of the machine.

Said shaft projects into a gear casing 29, with the other end of said shaft extending therethrough and contacted by a leaf spring 30, which serves to maintain said shaft 28 normally thrust in its outer position. Within said gear casing 29, a skew gear 31 is slidably mounted upon said shaft 28, as shown in Figure 16, and is caused to rotate said shaft owing to a pin 32, which extends through the hub of said gear and rests against a flat surface of a squared portion 33 of said shaft. Said shaft 28, is also provided with a rounded portion 34 of reduced diameter so that when the shaft is thrust inwardly through said gear 31, the rounded portion 34 of reduced diameter is brought into register with the pin 32, and consequently said shaft 28 is freed from driving connection with the gear 31, and hence comes to rest together with its pinion 27. Of course, the gear train thereby comes to rest and likewise the coin inspection belt 21, so that if it is desired to give a lengthy inspection to coins on the belt, the belt may be stopped for the purpose. Said gear casing 29 is supported upon the transverse partition or wall 9, between the casing 11 and the flange ring element 8. Also mounted upon said partition 9 is an electric motor 35, as shown in Figure 7, which has driving connection with a shaft 36, journalled horizontally in the gear casing 29, through a coupling shown in detail in Figures 18 and 19, which consists of two fingers 37 and 38, secured around the motor shaft by adjusting screws 39. Said shaft 36 on one end is provided with a flat extension 40, which projects between said finger elements 37 and 38, and is centrally apertured to engage around the end of the motor shaft, as shown in Figure 19. Said shaft 36, on the interior of the casing 29, has secured thereon a skew pinion 41, and its other end, as shown clearly in Figure 18, projects outwardly into a circular apertured collar member 42, and is provided with a pin 43 therethrough, whereby a hand crank (not shown) may be inserted into said collar member and engaged with the pin on said shaft to manually operate the same. The pinion 41 is held attached upon said shaft 36 by a pin 44, clearly shown in Figure 18.

Journalled vertically within the gear casing 29, as shown in Figures 15 to 18 inclusive, is a shaft 45. Journalled upon the lower end of said shaft is a skew pinion 46, meshing with the skew pinion 41, and formed integral with or rigidly attached upon the extended hub of said skew pinion 46, is a pinion 47. Disposed above said pinion 47 are two integral or rigidly associated pinions 48 and 49 respectively, which are attached to said shaft 45 by a pin 50. Secured upon one of the side walls of the casing 29, on the interior thereof is a yoke shaped frame element 51, in which is mounted a vertical shaft 52. Slidably mounted upon said shaft 52, and integral with one another or rigidly attached, are a pair of pinions 53 and 54 respectively, said pinion 53 being relatively wide across the face of the teeth so that the same although, as shown in Figure 15, only in mesh with pinion 47, may, when moved upwardly upon the shaft 52, mesh both with the pinions 47 and 48.

Engaging the hub portion between the respective pinions 53 and 54, is a fork element 55, which is rigidly secured upon the lower end of a link 56, extending slidably into the casing 29, along one wall thereof, and at its upper end, as shown in Figure 15, projecting outwardly and attached upon an eccentric 57. The eccentric 57 is secured upon a shaft 58, which is journalled through the casing wall 11 and also in a bearing on an extension 59 of the gear casing, and, exterior of the wall 11, is provided with an operating knob 60. Also secured upon said shaft 45 is a skew pinion 61, and as shown clearly in Figures 15 and 17, a skew pinion 62 meshes therewith, said latter pinion being pinned upon a shaft 63, journalled transversely of the gear casing 29. Said shaft 63 has slidable therethrough another shaft 64, which on one end is provided with a knob 65, and at its other end with one element 66, of a jaw clutch.

The jaw clutch element 66 is adapted to co-act with a similar clutch element upon the drive shaft of the coin counting registering mechanism hereinafter described. An aperture is provided in the casing wall 11, opposite to the knob 65, normally closed by a lever 67, so that when said aperture is open the shaft 64 may be drawn outwardly by the knob 65 to withdraw the clutch element 66 from co-active operation with its complemental member. The lever 67 is pivoted upon a pintle 69, shown in Figures 4 and 8, and is provided with a tail extension 70, which projects outwardly through a slot in the closure 71, of the casing 11. Said tail extension 70, of the lever, as shown clearly in Figure 4, is offset so as to normally engage beneath one of the assembly rods 72, which extend transversely across and within the casing 11, as shown clearly in Figure 9. The tail extension 70 is also apertured, and mounted upon the closure 71, of the casing adjacent thereto is a lug 73, of similar shape and likewise apertured to receive a padlock to engage therethrough and through the tail 70, as shown in Figures 3 and 9, thereby locking the lever 67 in closed position over the aperture giving access to the knob 65. Secured upon the upper end of the upright shaft 45, within the gear casing is a skew pinion 68, which meshes with and serves to drive the skew pinion 31 hereinbefore mentioned.

The coin counting and registering mechanism forming a part of this construction is of a familiar and well-known type constituting the subject matter of other of my applications for patent and only the exterior thereof to show the general association and assembly with the rest of the units of the structure are shown, as the particular operating mechanism of the counting device forms no part of the present invention. As shown in Figures 7 and 9, a casing enclosing the coin counting mechanism is mounted upon a transverse partition 74, and is denoted as a whole by the reference numeral 75. The mount of said casing is disposed beneath the discharge end of a chute 76, which is mounted in the casing 11 beneath the inspection belt 21, so as to receive coins discharged therefrom over the roll 19.

A discharge chute 77 is shown in Figure 7 leading from the coin register mechanism, supported beneath the horizontal partition wall 74, and also upon the partition wall 9, is another chute 78, for the discharged coins which registers beneath said chute 77. As shown in Figure 8, a third chute 79 is attached beneath the partition 9, in register with an aperture therethrough into which said chute 78 discharges.

*Fare box lock and electric switch mechanisms.*

A lock controlled mechanism is provided for the switch of the electric circuit of the motor 35. As shown in Figures 10 and 8, a terminal block or plug receptacle 80 adapted to receive an electrical connection is provided, mounted upon a plate 81, which is shown clearly in Figures 8 and 10, is supported upon the ring element 8. A switch is provided, denoted as a whole by the reference numeral 82, of cylindrical shape also mounted upon said plate 81, and projecting therethrough, as clearly shown in Figure 8. Said switch element 82 is provided with an axial actuating shaft, which extends outwardly and through the ring element 8, of the wall of the casing and is provided with an actuating knob 83. Said knob, as shown clearly in Figure 11, is marked with an indicating arrow adapted to point vertically, that is showing that the switch is " off," or horizontally, to indicate that the switch is " on." Operation of said knob 83 is controlled by a lock mechanism 84.

Mounted upon the shaft of the switch 82, near the end of the actuating knob 83, is a notched disk 85, shown in detail in Figure 21, and pivoted upon a pivot 86, is a lever 87, having a tail or tooth 89, adapted to engage in the notches of the disk 85. Also pivotally connected upon said lever 87 is a spring impelled slidable plunger 88, shown in detail in Figure 23, which is normally projected downwardly under the stress of its spring into its dotted line position, shown in Figures 21 and 23. As clearly shown in Figure 21, said lever 87 is provided with a slot 90, which is engaged by a pin 91, eccentrically mounted upon the rear end of lock cylinder of the lock 84. Also secured upon the rear end of the lock cylinder, as shown in Figure 23, is a tail lever 92, which is capable of movement though an angle of 90 degrees, as shown in dotted lines, and said tail lever 92 and plunger 88 co-act in a manner hereinafter described to lock the closure 4 of the fare box compartment for the receiving receptacle or coin can.

Slidably mounted beneath the circular plate 81, and bent upwardly at one end through a cutaway portion of said plate and engaging through a barrel element 93 is a long slide rod or bar 94, shown clearly in Figures 10 and 12, and the end thereof terminating in said barrel 93, is adapted to be projected into the path of the rear end of the lever 87, as shown in Figure 21, when said lever is elevated into the position shown. As shown in Figure 12, a spring 95 is attached about a screw on the under surface of the plate 81, and bears against the bent portion of said rod 94, to normally impel the same in a direction to project through the barrel element 93, into the path of the lever 87, when the same is elevated. The other end of said rod or bar 94 co-acts with the receiving receptacle or coin can in a manner hereinafter pointed out.

Attached to said circular plate 81 is a terminal block for the electric system comprising a long insulating member 96. Secured upon the insulating terminal member 96 is a bus bar 97. Two main circuit wires 98 and 99 respectively lead from the terminal block 80 to the switch 82, and leading from one side of said switch to the terminal block 96 is a lead 100. Another lead 101 is connected to the switch 82 and leads to one end of a resistance element comprising a long insulating member 102, supported on brackets 103, connected on each end thereof and attached to the plate 81. Said resistance member is provided with a plurality of coils 104, all connected in series, and with said lead 101 connected to the first of said coils. Leading from each of the other of said coils 104, are wires 105, which lead to the bus bar 97, and each can be connected thereto as desired by insertion of a proper plug at the normally insulated connection between the wire and the bus bar. Connected to the bus bar is a wire 106, leading to a terminal 107. Another terminal 108 is provided on the insulating member 96, which is connected by a wire 209 with a conductor on said resistance member 102, which is in direct circuit with the first coil 104, which is in electrical circuit with the conductor on the interior of the insulating member and therefore with the first coil or lead wire 101. The lead wire 100 from the switch to the insulating member 96 is secured in a terminal post 109. Consequently there are three terminals, 107, 108 and 109 respectively, either two of which may be closed through the motor 35, so that none of the coils 104 are in circuit or any one or all thereof as desired, according to the resistance which it is desired to introduce into the circuit. Also mounted upon the shaft of the switch element 82, as shown in Figures 20 and 22, is an oval shaped cam 110, and pivoted upon the frame plate 9, is a depending arm 111, contacting said cam, and with said arm 111 connected through its pivotal mounting in the plate 9, to an upwardly extending crank arm 112, shown in Figure 8. Said upwardly extending crank arm 112 is adapted to be moved into a position to cause one of the bars 38 or 37, as the case may be, of the motor driven shaft to strike thereagainst and stop movement of the shaft when the switch is placed in off position by rotation of the knob 83.

Coin receptacle and casing operating mechanisms.

The receptacle for receiving the coins which are deposited into the machine to transfer the same from the machine to a place of counting and deposit comprises a can shown in Figure 30, denoted as a whole by the reference numeral 113, having a bottom 114 and a top section 115. This can is adapted to be supported upon a circular table 116, rotatable about a pivot 117, and having a pair of centrally disposed parallel ribs 118, and another pair of ribs 119, on which said can is supported, the ribs 119 adapted to register with the ends of ribs 120, on the table extension 2 at the base of the machine, when said table 116 is in either one of its revolved positions, that is with the door 4 open or closed as the case may be. The central pivot shaft 117 and its associated nut and washer for holding the table 116 in place is countersunk below said ribs 118.

The bottom 114 of the can is provided with a diametrical rib 121, which terminates at one of its ends in a peripheral rib on the bottom 114, and with notches or openings 122 on each side thereof at its other end whereby, when the can is placed into the machine, said rib 121 engages the ribs 118, and owing to the provision of the notches 122, it is only possible to place the can in one position for insertion into the machine. In the bottom plan view of the rotatable can supporting table 116, shown in Figures 24 and 25, it will be seen that a latch pin 123 is provided slidably mounted beneath the table base extension 2, and is adapted to normally engage with either one of two notches provided therefor in the edge of said rotatable table 116. Said latch 123 is provided with a finger piece 124, which is disposed beneath a slot 125, in said table extension whereby the finger of an operator may be inserted therein to retract said latch and permit the door of the machine, with or without a can on the table 116, to be swung into closed position.

Said door 4 of the device is rigidly attached to the rotatable table 116, and at its upper end is attached to an internal annular ratchet gear 126, shown in Figure 12. As shown in Figures 8 and 12, three rollers are provided spaced equidistantly apart and attached upon the under surface of the ring element 5 to bear against the inner upper flanged periphery of the annular ratchet gear 126, and maintain the same and said door concentrically within the casing 3. Pivotally mounted on the upper side of the downwardly bent portion 6 of the partition member 5, as shown in Figures 8 and 12, is a pawl 128, having a spring 129, permitting said door 4 and rotatable table 116 to be rotated in only one direction.

As clearly shown in Figure 8, the upper end section 115 of the can contacts against downwardly bent end of the slide rod or bar 94, so that whenever a can is inserted into the machine, the upper end of the can strikes the downturned end of the bar 94 to insure retraction of the other end thereof into the barrel 93, and out of the path of movement of the lever 87. Centrallizing shoes 130 are attached to the inner periphery of the lower flange of the ratchet wheel 126, as shown in Figure 27, to insure that the can is properly positioned when it is inserted into the machine.

Secured upon the under surface of the portion 6 of the transverse partition member 5, as shown in Figure 27, is a stop plate 131 to limit the inward movement of said slide bar 94. Also attached beneath said portion 6, as shown in Figure 26, is a conical downwardly protruding element 132, and a small stationary bar 133 adjacent thereto, also shown in Figure 27, for purposes hereinafter pointed out.

*Construction of the coin receptacle.*

Said upper section 115 of the can is provided with an inwardly and upwardly directed integral extension 134, and mounted therein, as shown in Figure 31, is a pintle bolt 135. Journalled thereon and with a rigid locking cam 136 beneath the same, is a can closure element 137, having a coin receiving opening 138 therein adapted for register beneath the opening shown in the portion 6 of Figure 12, into which the chute 79 discharges, shown in Figure 8. Attached into the under surface of the closure element 137 is a locking mechanism 139, which is only releasable by a key and consists in part of a projecting member 140, adapted to engage in locking relation with a slot or cutaway portion 141, in the upper rim of the can section 115, as shown in Figures 8 and 32. Even when said locking mechanism 139 is in unlocked position, the projecting element 140 is not fully retracted, and therefore a peripheral groove 142 is provided on the interior of the neck portion of the can section 115, as shown in Figures 32 and 8.

Slidably mounted in the cover element 137 is a pin 143, adapted when the can is inserted properly into place in the machine to register beneath the conical element 132, of the portion 6 of the casing and thereby be depressed against the stress of its compression spring 144. On the lower end of said pin is a circular head 145, adapted to seat in the notch of said cam element 136, when said pin 143 is not depressed, thus locking the closure element 137 to the cam 136 so that the closure element cannot be rotated unless said pin is depressed.

Also projecting upwardly from the closure element 137, is a pin 146, as shown in Figures 26 and 33. Said pin 146 is adapted to contact against the stop or bar 133, as shown in Figures 26 and 27. As shown in Figure 30, the can element is provided with an inwardly formed hand grip 147, near the base thereof to facilitate placing and withdrawal of the can from the machine. Two exterior handles 148 are also provided as shown in Figure 7, and these are secured on the interior of the can as shown in Figure 30.

The operation is as follows:

The coins are deposited into the hopper 13, and fall through the apertures in the plate 14, upon the deflecting shield 15, then into the chute 16 and thence onto the travelling belt 21, which affords the bottom of the glass inspection compartment 12. If the operator desires to give further inspection to the coins upon the travelling belt than the time allowed for the belt to carry the coins to a point of discharge, he may depress the shaft 28, shown in Figures 3 and 16, thereby disengaging the drive from the pinion 31 and consequently to the pinion 27, and consequently the drive to the gear train 25 and 24, shown in Figure 4, for the inspection belt rolls is disconnected and the belt comes to a rest. Release of pressure upon the end of the shaft 28 will cause the spring 30 on the opposite end of said shaft to restore the same into driving relation with its pinion.

If the travel of the belt 21 is not interrupted, the coin is carried thereby over the roll 19 and is discharged into the chute 76, shown in Figure 4, and slides downwardly thereon and falls into the upper open end of the coin hopper 75, shown in Figures 9 and 7. The coin counting mechanisms are enclosed within a casing of which said hopper 75 forms a part, and said mechanisms are constantly driven by a motor 35, which is mounted therebelow and serves to drive the same through a train of gears enclosed within the gear casing 29, the gears of which are shown in detail in Figure 15. The gears within the casing 29 permit the coin counting mechanism as well as the inspection belt 21 to be driven at either one of two speeds, that is fast or slow as desired, so that if a great number of coins are to be handled the speed of operation of the machine may be readily increased.

This speed change is effected in the following manner: Referring to Figure 15, it will be seen that the gear 41 receives its drive from the shaft 36, which is driven by the motor 35 and drives the skew gear 46. The pinion 47 is rigid with the gear 46 journalled upon the upright shaft 45, and drives the relatively wide gear or pinion 53, which, together with the pinion 54, is slidable upon the shaft 52. With said associated slidable gears 52 and 53 in the position shown in Figure 15, the pinion 53 receives its drive from the pinion 47, and owing to the rigid connection with the pinion 54, said pinion 54 drives the pinion 49, which is rigid upon the upright shaft 45. The pinion 54 is only one-half the diameter of the pinion 49, and consequently the speed of rotation of the shaft 45 is only one-half of that of the gear 46. However, when the associated gears 53 and 54 are moved upwardly upon the shaft 52 by rotating the knob 60, whereby the eccentric 57 elevates the link 56 and consequently the yoke 55 engaging the hub portion of said gears 53 and 54, the gear 54 is lifted out of mesh with the pinion 49, and the wide pinion 53 meshes both with the pinion 47 and the pinion 48, which is rigid with said pinion 49. This imparts a direct one-to-one drive to the shaft 45, so that the speed of rotation thereof is the same as that of the gear 46 on its lower end, or, in other words, twice that for the lower position of the gears 53 and 54.

The coin falls from the chute 78 into the chute 79, and thence by said latter chute into the opening 138 in the upper end of the coin receptacle or can 113. Inasmuch as the annular ratchet 126 is rigidly connected to the supporting table 116 for the can by means of the semi-circular door 4, it is obvious that the locking mechanism which interlocks with the rim of said ratchet serves also to lock said door 4 in closed position. Owing to the fact that the bottom of the can 113 is shaped complementally with the table 116 for positive engagement therewith when inserted into the machine, it is obvious that the can is rotatable as a unit with said door and table, and cannot be placed upon said table when inserted into the machine except in a particular manner.

Assume the door 4 to be in open position and the can 113 about to be placed into the machine. The can 113 is now empty of any coins, and the rotatable closure 137 thereof is in open position. When the can is inserted into the machine upon the rotatable table 116, the can and table are rotated in a clockwise direction to close the door 4, and as the door 4 finally swings into closed position the rotational movement of the can brings the pin 143 into register with the protuberance 132, as shown in Figure 26, thereby depressing the pin 143. At the same time that the pin 143 comes into register with the protuberance 132, the upwardly projecting pin 146 on the closure 137 of the can strikes against the stationary bar 133, shown in Figure 26. Further rotation of the can, however, within the machine does not take place as the door 4 is now closed. With said closure in the open position in which the can is inserted into the machine, the lock member 140 of the key lock 139 in the closure of the can, is retracted into the groove 142, shown in Figure 31, at a position directly opposite to the recess 141, shown in Figure 32.

After the coins have been received into the can 113, and it is desired to remove the same from the machine, the lock 84 is unlocked thereby permitting rotational adjustment of the ratchet 126, door 4, table 116 and the can 113 thereon in a clockwise direction. Owing to the fact that the pin 143 is in depressed position, the closure 137 is released from the locking cam 136 for relative rotation with the can and, due to the fact that the pin 146 bears against the stationary stop 133, rotational adjustment of the can will take place around its closure 137, which is held stationary. The angular adjustment of the can being through 180 degrees will bring the lock 139 of the closure into position for the lock member 140 to spring into the notch 141, so that the can becomes automatically locked with its closure in closed position. The door 4 now being open, the can may be withdrawn, having progressed through an adjustment of 360 degrees since insertion into the machine.

It is possible to entirely disconnect the drive to the coin counting mechanism without interfering with the drive to the coin carrying belt 21, and this is accomplished by sliding the shaft 64 outwardly, shown in Figures 15 and 17, by use of the knob 65, so that the clutch member 66 is withdrawn from driving connection with the complemental clutch element on the main drive shaft of the coin counting mechanism. However, it is not possible to withdraw said shaft 64 under ordinary conditions owing to the fact that the knob 65 is not accessible from the exterior of the casing so long as the tail of the lever 67 is in closed position across the aperture in the casing 11, which gives access to said knob 65. The lever 67 is clearly shown in Figures 4 and 8 and obviously it is not possible to elevate the tail from the aperture in the casing 11 unless the padlock is detached from the projecting end 70 of said lever, which projects through the door 71 of the casing. If it is desired to operate the coin counting mechanism, as well as the travelling belt 21, by hand, a crank may be inserted into the apertured member 42, shown in Figure 7, and engaged upon one end of the shaft 36.

Switch mechanism is provided for switching the current on and off to the electric motor 35, and the accessible means for manual operation thereof is a knob 83, shown on the exterior of the casing in Figures 11 and 1. Said knob is provided with an indicating arrow and has two positions which are 90 degrees apart, the "on" position being the vertical position of the arrow shown in Figure 11, and the "off" position a horizontal position. The switch is always turned in a clockwise direction either in turning the same on or off. Said switch mechanism has coactive operation with the locking means which permits ingress to the machine for the purpose of inserting or removing a coin receptacle. As shown in Figures 20 and 21, the operating shaft for the switch 82 has the notched disk 85 thereon with two notches diametrically disposed which correspond to the "off" position of the switch. That is, when the switch is in "off" position one of the notches is in a position to receive the tail portion or tooth 89 of the lever 87 engaged thereinto, but said tail portion of the lever does not engage with the notch unless the locking mechanism 84, accessible from the exterior of the casing, is operated into unlocked position.

Such operation of the locking mechanism serves to elevate the pin 91, which is eccentrically mounted on the locking cylinder, as shown in Figures 21 and 23, and which is engaged with the notch of said lever 87 and serves to elevate the rear portion of said lever, thereby depressing the tooth 89 into engagement with one of the notches on the switch disk 85. The normal position of the plunger 88, which is also attached to the lever 87, is the "down position," as shown in dotted lines in Figures 21 and 23, whereby the same is in interlocking relation with the recessed portion of the rim of the annular ratchet gear 126. The tail lever 92, which is secured upon the inner end of the cylinder of the lock 84, as shown in Figure 23, also has engagement with the recessed portion of the rim of the ratchet gear 126, and said recessed portion is of arc shape at its end to permit the rotational adjustment of said tail lever 92 into its horizontal position, when the lock is moved to unlocked position.

Having described in detail the operation of the machine, I shall now summarize the general operation thereof in the following:

With the machine in open position for use, the can 113 is inserted therein with the closure 137 of said can in open position. When the can is inserted into the machine, the rim of the neck thereof strikes against the depending end of the slide bar 94, shown in Figures 8 and 12, thereby retracting said bar 94 so that the lever 87 of Figure 21 can be engaged by the pin 91 and the lock 84 is actuated into locking position. After the can is properly inserted into the machine by engagement with the ribs 118 on the supporting table 116, the can and table are rotated to bring the semi-circular door 4 into closed position, thereby revolving the can through an angle of 180 degrees. The ratchet wheel 126, at the upper end of the door 4, coacting with its pawl serves to prevent reverse rotation of said door and the table with the can thereon. After the door has been moved into closed position, the lock 84 is turned to locked position so that the plunger 88, of Figure 23, and the tail lever 92 engage with the recess in the ratchet rim 126, thus locking the door and the cam from further adjustment.

The coins now deposited into the machine fall through the inspection compartment 12 upon the travelling belt 21 and are carried thereby for discharge into the chute 76, falling therefrom into the coin hopper 75, and after being counted by the coin mechanism are discharged from said mechanisms into the chute 77, and from there fall into the chutes 78 and 79 through the opening 138 in the coin receiving can. When it is desired to remove the receptacle with the coins from the machine, the switch is first turned to "off" position. The key is inserted in the lock 84 and the same is turned to unlocked position, thereby projecting the tail 89 of the lever 87 into engagement with a notch in the switch disk 85 to prevent actuation of the switch, and operation of the lock serves to elevate the pin 91 and plunger 88, so that the ratchet 126 and door 4, together with the can, may be revolved to bring the door into open position for withdrawal of the can. Owing to the fact that the pin 146 on the upper portion of the can closure contacts the stationary bar 133, the closure is held from movement as the can is rotated, so that the relative rotational movement between the closure and the can serves to bring the closure into closed position, and the lock member 140 of the closure interlocks as it comes into register with the recess 141 of the can, locking the can closed before it is completely accessible for removal from the device. With the switch in locked off position the mechanism cannot be operated to pass coins therethrough.

I am aware that numerous details of construction may be varied through a wide range without departing from the principles of this invention, and I therefore do not purpose limiting the patent granted otherwise than necessitated by the prior art.

I claim as my invention:

1. A machine of the class described comprising coin counting mechanisms, a drive therefor, a compartment in said machine, a coin receiving receptacle adapted to be placed therein to receive coins from the counting mechanisms, and means necessitating cutting off the drive to said mechanisms when the machine is unlocked for withdrawal from the receptacle.

2. A machine of the class described comprising coin receiving and coin counting mechanisms, a receptacle to receive the coins, insertable within said machine and removable therefrom, a closure to enclose said receptacle in the machine, and means on said closure serving to move said receptacle into proper position to receive the coins as said closure is operated to closed position.

3. A machine of the class described comprising coin receiving means, mechanisms for counting and discharging the coins after counting the same, a drive for said mechanism, a receiving receptacle to be placed into said machine, locking mechanism for said machine, switch mechanism controlling the drive to said counting mechanism, coactive means operated by insertion of said receptacle to release the locking mechanism for in turn releasing said switch mechanism, and means enclosing the receptacle in the machine.

4. In a machine of the class described, coin counting mechanisms, an electric drive therefor, switch controlling means for said drive, a receptacle insertable into said machine, a lock for locking the same therein and coactive means between said lock and said switch means whereby the switch is locked in off position when the lock is unlocked for removal of the receptacle.

5. In a machine of the class described, coin counting mechanism, a removable coin receptacle within said machine to receive the counted coin, a lock for said receptacle, a compartment within said machine to receive said receptacle placed therein in open unlocked position, a closure for said compartment and means operating when said closure is moved to closed position to move said receptacle into position to receive the coins, and release the coin counting mechanism for operation.

6. A machine of the class described, comprising means for counting coins, a receptacle to receive the coins deposited into said machine and removable therefrom, a lock for said receptacle, power mechanism for driving said coin counting means, switch mechanism therefor, a closure for said machine to close the receptacle therein, means operable by the closure to release said switch mechanism for operation, and means associated with said closure and acting when the same is operated to open position to lock said receptacle with the coins therein, and to lock said switch in position against operation.

7. In a machine of the class described, a receptacle removable from the machine to receive the coins thereinto, a closure rotatably mounted in said receptacle, a rotatable receiving means within said machine to receive said receptacle mounted thereon, and a closure for the machine to lock the receptacle therein, means associated with said closure serving by operation thereof into open position to revolve said receptacle and cause closure thereof by the closure therefor prior to removal from the machine.

8. In a machine of the class described, a receptacle for coins adapted to be placed therein, movable means to receive said receptacle, a movable closure for said receptacle, and a movable closure for the machine to close said receptacle therein, and means on said latter closure acting when the same is moved into open position to move likewise the means on which said receptacle is supported to cause a movement of the receptacle closure into closed position, and to lock said receptacle from access prior to removal from the machine.

9. In a machine of the class described, a rotatable table a closure for a compartment within said machine connected for movement with said table, a coin receiving receptacle adapted to be placed within said compartment and supported upon said table, closure means for said receptacle, and means whereby said closure means are operated into closed locked position when the receptacle is on said table and the closure for said machine is moved into open position to permit withdrawal of receptacle from the machine.

10. A machine of the class described, comprising, a coin counting means, a power drive therefor, a switch mechanism for controlling the operation of the power drive, a lock for said machine co-actively arranged with said switch whereby the lock cannot be operated except when said switch is in off position; a compartment within said machine to receive a coin receptacle placed therein and a closure for said compartment controlled by said lock for opening and closing said compartment.

11. In a machine of the class described a coin counting means, a switch controlled power drive therefor, a compartment within the machine, a coin receptacle adapted to be placed therein in open position to receive the coins from the counting means, a closure for said compartment and a mechanism whereby said closure is rendered unopenable when said power drive is in operation and serving by movement to open position to lock the receptacle in closed condition prior to removal thereof from the machine.

12. In a machine of the class described, a means for counting coin, a power drive for said means, a switch mechanism controlling operation of said power drive, a compartment within said machine to receive a coin receiving receptacle placed therein, a rotatable table to receive said receptacle placed thereon, a closure to close and open said compartment connected with said table for movement therewith, a movable closure on the receptacle and means on said machine co-acting with said latter closure whereby movement of the closure of the machine to open position serves to lock the closure of said receptacle prior to removal of the receptacle from the machine.

13. In a machine of the class described, a coin counting means, a power drive therefor, a switch controlling the operation of said power drive, a compartment within said machine to receive a coin receptacle placed therein, a closure for said compartment, a lock on said machine to lock said closure in closed position, and means associated with said lock permitting operation thereof only when said switch is in off position and serving to lock said switch from operation when lock is in unlocked position.

14. A machine of the class described, comprising a coin counting means, a switch controlled power drive therefor, a compartment within said machine to receive a receptacle placed therein, a closure for said compartment, a lock controlling the operation of said closure and acting to prevent operation of the power drive when said closure is open.

15. A machine of the class described, comprising coin counting mechanisms, a power drive therefor, a coin receptacle, means enclosing said receptacle, and locking means for the drive and the receptacle associated with said enclosing means.

16. In a machine of the class described, a coin counting means, a power drive therefor, a variable speed connection therebetween, switch mechanism controlling said power drive, a compartment within said machine to receive a coin receiving receptacle placed therein, a closure for said compartment, and a lock for locking said closure co-actively associated with said switch mechanism to lock the switch mechanism from operation when the lock is in open position.

17. In a machine of the class described, a coin inspection compartment, movable inspection means on which coins are carried after deposit into the machine, a coin counting means to which the coins are delivered, a power drive for said inspection and counting means, transmission mechanisms between said power drive and both of said means permitting change in speed of the drive thereof and permitting the drive to be disconnected from each of said means, a switch controlling said power drive, and a compartment within said machine to receive a receptacle placed therein the locking and unlocking of said compartment governing the operation of said switch mechanism.

18. In a machine of the class described, a movable coin inspection means, a coin counting mechanism to receive coins therefrom and a power drive for said means and mechanism, a switch controlling the operation of the power drive, a compartment within said machine to receive a receptacle placed therein to receive coins from said mechanism, a lock for said compartment, and a co-active means between said lock and switch to lock said switch from operation when the compartment is locked, and to prevent operation of said lock when the compartment is unlocked with a receptacle therein with the switch in position to cause the drive to operate.

19. In a machine of the class described, coin counting mechanisms, a power drive therefor, controlling means for said power drive, a receptacle insertable into the machine, means for locking the receptacle therein, and means coacting with said controlling means and said locking means whereby the controlling means are locked in off position when the locking means are in position to permit removal of the receptacle.

20. In a machine of the class described, a counting mechanism, a power drive therefor, a removable receptacle adapted to receive articles counted by said mechanism, a lock for retaining said receptacle in article receiving position, and means coacting with said lock for locking the power drive from operation when the receptacle is removed from the machine.

In testimony whereof I have hereunto subscribed my name in the presence of two subscribing witnesses.

HUGO J. BAUR.

Witnesses:
 EARL M. HARDINE,
 CHARLES W. HILLS, Jr.